(12) United States Patent
Kim et al.

(10) Patent No.: US 11,025,548 B2
(45) Date of Patent: Jun. 1, 2021

(54) CONTROL DEVICE AND METHOD OF VEHICLE MULTI-MASTER MODULE BASED ON RING COMMUNICATION TOPOLOGY BASED VEHICLE

(71) Applicant: HYUNDAI AUTRON CO., LTD., Seoul (KR)

(72) Inventors: Kee Beom Kim, Seongnam-si (KR); Young Suk Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/208,879

(22) Filed: Dec. 4, 2018

(65) Prior Publication Data

US 2019/0182164 A1 Jun. 13, 2019

(30) Foreign Application Priority Data

Dec. 8, 2017 (KR) .......................... 10-2017-0168625

(51) Int. Cl.
*H04L 12/801* (2013.01)
*H04L 12/417* (2006.01)
(Continued)

(52) U.S. Cl.
CPC ............ *H04L 47/13* (2013.01); *H04L 12/417* (2013.01); *H04L 12/433* (2013.01); *H04L 2012/421* (2013.01)

(58) Field of Classification Search
CPC ................. H04L 12/417; H04L 12/433; H04L 2012/421; H04L 47/13
See application file for complete search history.

(56) References Cited

U.S. PATENT DOCUMENTS

| 6,907,041 | B1 * | 6/2005 | Turner ................ H04L 12/5601 370/388 |
| 2004/0153861 | A1 * | 8/2004 | Ohno ...................... H04L 12/43 714/43 |

(Continued)

FOREIGN PATENT DOCUMENTS

KR 10-2000-0028318 A 5/2000
KR 10-2005-0120642 A 12/2005
(Continued)

*Primary Examiner* — Stephen J Clawson
(74) *Attorney, Agent, or Firm* — Morgan, Lewis & Bockius LLP

(57) ABSTRACT

Provided is a collision prevention system of a multi-master including: a plurality of external modules; and an integrated device. The integrated device includes: a plurality of interfaces connected respectively to the plurality of external modules and respectively controlled by corresponding external modules; a plurality of internal modules; a plurality of dedicated buffers connected respectively to the plurality of interfaces and the plurality of internal modules; and a common block connected to the plurality of dedicated buffers and controlled by the plurality of interfaces and the plurality of internal modules. The plurality of dedicated buffers includes a GBU and a plurality of LBUs. The GBU and the plurality of LBUs are connected to two neighboring GBUs and a plurality of LBUs to form a ring communication topology, which transmits ring communication data in one direction. The common block is connected to the ring communication topology through the GBU.

8 Claims, 13 Drawing Sheets

(51) Int. Cl.
*H04L 12/433* (2006.01)
*H04L 12/42* (2006.01)

(56) References Cited

U.S. PATENT DOCUMENTS

| | | | | |
|---|---|---|---|---|
| 2009/0234910 A1* | 9/2009 | Chung | ................ | H04L 63/0414 |
| | | | | 709/203 |
| 2012/0284335 A1* | 11/2012 | Chung | ................ | H04L 63/0414 |
| | | | | 709/204 |
| 2014/0376555 A1* | 12/2014 | Choi | ....................... | H04L 49/70 |
| | | | | 370/395.53 |
| 2016/0321012 A1* | 11/2016 | Clark | .................... | G06F 3/0659 |

FOREIGN PATENT DOCUMENTS

| | | |
|---|---|---|
| KR | 10-2012-0012875 A | 2/2012 |
| KR | 10-2012-0080369 A | 7/2012 |

\* cited by examiner

FIG. 5A

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | 1 | 1 | 2 | 0 | XXXX |
| LBU#2 (IP Number 2) | X | X | X | X | 0000 |
| LBU#3 (IP Number 3) | X | X | X | X | 0000 |
| GBU (IP Number 0) | 0 | 0 | 0 | 0 | 0000 |
| COMMON BLOCK | N/A | 0 | 0 | 0 | 0000 |

FIG. 5B

| COMMUNICATION DATA INFORMATION AT CORRESPONDING GBU/LBU POSITION | | | | | |
|---|---|---|---|---|---|
| | token | IP Number | Priority Level | COMMON BLOCK IP Number | DATA |
| LBU#1 (IP Number 1) | X | X | X | X | 0000 |
| LBU#2 (IP Number 2) | 1 | 1 | 2 | 0 | XXXX |
| LBU#3 (IP Number 3) | X | X | X | X | 0000 |
| GBU (IP Number 0) | 0 | 0 | 0 | 0 | 0000 |
| COMMON BLOCK | N/A | 0 | 0 | 0 | 0000 |

FIG. 5C

| COMMUNICATION DATA INFORMATION AT CORRESPONDING GBU/LBU POSITION | | | | | |
|---|---|---|---|---|---|
| | token | IP Number | Priority Level | COMMON BLOCK IP Number | DATA |
| LBU#1 (IP Number 1) | X | X | X | X | 0000 |
| LBU#2 (IP Number 2) | X | X | X | X | 0000 |
| LBU#3 (IP Number 3) | 1 | 1 | 2 | 0 | XXXX |
| GBU (IP Number 0) | 0 | 0 | 0 | 0 | 0000 |
| COMMON BLOCK | N/A | 0 | 0 | 0 | 0000 |

FIG. 5D

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 1 | 1 | 2 | 0 | XXXX |
| COMMON BLOCK | N/A | 0 | 0 | 0 | 0000 |

FIG. 5E

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 0 | 0 | 0 | 1 | 0000 |
| COMMON BLOCK | N/A | 1 | 2 | 0 | XXXX |

FIG. 6A

| | \multicolumn{5}{c|}{COMMUNICATION DATA INFORMATION AT CORRESPONDING GBU/LBU POSITION} |
|---|---|---|---|---|---|
| | token | IP Number | Priority Level | PREVIOUSLY-PASSED IP Number | DATA |
| LBU#1 (IP Number 1) | 1 | 1 | 2 | 0 | XXXX |
| LBU#2 (IP Number 2) | X | X | X | X | 0000 |
| LBU#3 (IP Number 3) | X | X | X | X | 0000 |
| GBU (IP Number 0) | 0 | 0 | 0 | 0 | 0000 |
| COMMON BLOCK | N/A | 0 | 0 | 0 | 0000 |

FIG. 6B

| | \multicolumn{5}{c|}{COMMUNICATION DATA INFORMATION AT CORRESPONDING GBU/LBU POSITION} |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | 1 | 1 | 2 | 0 | XXXX |
| LBU#3 (IP Number 3) | X | X | X | X | 0000 |
| GBU (IP Number 0) | 0 | 0 | 0 | 0 | 0000 |
| COMMON BLOCK | N/A | 0 | 0 | 0 | 0000 |

FIG. 6C

| | \multicolumn{5}{c|}{COMMUNICATION DATA INFORMATION AT CORRESPONDING GBU/LBU POSITION} |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | 1 | 1 | 2 | 0 | XXXX |
| GBU (IP Number 0) | 0 | 0 | 0 | 0 | 0000 |
| COMMON BLOCK | N/A | 0 | 0 | 0 | 0000 |

FIG. 6D

| | \multicolumn{5}{c|}{COMMUNICATION DATA INFORMATION AT CORRESPONDING GBU/LBU POSITION} |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 1 | 1 | 2 | 0 | XXXX |
| COMMON BLOCK | N/A | 0 | 0 | 0 | 0000 |

FIG. 6E

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 0 | 0 | 0 | 1 | 0000 |
| COMMON BLOCK | N/A | 1 | 2 | 0 | XXXX |

FIG. 6F

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | 0 | 0 | 0 | 1 | 0000 |
| LBU#2 (IP Number 2) | X | X | X | X | 0000 |
| LBU#3 (IP Number 3) | X | X | X | X | 0000 |
| GBU (IP Number 0) | 0 | 0 | 0 | 1 | 0000 |
| COMMON BLOCK | N/A | 1 | 2 | 0 | XXXX |

FIG. 6G

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | 0 | 0 | 0 | 1 | 0000 |
| LBU#3 (IP Number 3) | X | X | X | X | 0000 |
| GBU (IP Number 0) | 0 | 0 | 0 | 1 | 0000 |
| COMMON BLOCK | N/A | 1 | 2 | 0 | XXXX |

FIG. 6H

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | 1 | 3 | 4 | 1 | YYYY |
| GBU (IP Number 0) | 0 | 0 | 0 | 1 | 0000 |
| COMMON BLOCK | N/A | 1 | 2 | 0 | XXXX |

FIG. 6I

| | COMMUNICATION DATA INFORMATION AT CORRESPONDING GBU/LBU POSITION | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 1 | 3 | 4 | 1 | YYYY |
| COMMON BLOCK | N/A | 1 | 2 | 0 | XXXX |

FIG. 6J

| | COMMUNICATION DATA INFORMATION AT CORRESPONDING GBU/LBU POSITION | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 0 | 0 | 0 | 3 | 0000 |
| COMMON BLOCK | N/A | 3 | 4 | 1 | YYYY |

FIG. 7

| COMMUNICATION DATA INFORMATION AT CORRESPONDING GBU/LBU POSITION | | | | | |
|---|---|---|---|---|---|
| | token | IP Number | Priority Level | PREVIOUSLY -PASSED IP Number | DATA |
| LBU#1 (IP Number 1) | x | x | x | x | 0000 |
| LBU#2 (IP Number 2) | x | x | x | x | 0000 |
| LBU#3 (IP Number 3) | 1 | 1 | 2 | 0 | XXXX |
| GBU (IP Number 0) | 0 | 0 | 0 | 0 | 0000 |
| COMMON BLOCK | N/A | 0 | 0 | 0 | 0000 |

| LBU#3 (IP Number 3) POSITION | token | IP Number | Priority Level | PREVIOUSLY -PASSED IP Number | DATA |
|---|---|---|---|---|---|
| RING COMMUNICATION DATA PASSED FROM LBU#1 (IP NUMBER 1) | 1 | 1 | 2 | 0 | XXXX |
| LBU#3 (IP NUMBER 3) IS RING COMMUNICATION DATA FOR ATTEMPTING TO ACCESS COMMON BLOCK | 1 | 3 | 4 | 0 | YYYY |

FIG. 8A

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | 1 | 3 | 4 | 0 | XXXX |
| LBU#2 (IP Number 2) | X | X | X | X | 0000 |
| LBU#3 (IP Number 3) | X | X | X | X | 0000 |
| GBU (IP Number 0) | 0 | 0 | 0 | 0 | 0000 |
| COMMON BLOCK | N/A | 0 | 0 | 0 | 0000 |

FIG. 8B

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | 1 | 3 | 4 | 0 | XXXX |
| LBU#3 (IP Number 3) | X | X | X | X | 0000 |
| GBU (IP Number 0) | 0 | 0 | 0 | 0 | 0000 |
| COMMON BLOCK | N/A | 0 | 0 | 0 | 0000 |

FIG. 8C

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | 1 | 1 | 2 | 0 | YYYY |
| GBU (IP Number 0) | 0 | 0 | 0 | 0 | 0000 |
| COMMON BLOCK | N/A | 0 | 0 | 0 | 0000 |

FIG. 8D

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 1 | 1 | 2 | 0 | YYYY |
| COMMON BLOCK | N/A | 0 | 0 | 0 | 0000 |

FIG. 8E

| COMMUNICATION DATA INFORMATION AT CORRESPONDING GBU/LBU POSITION ||||||
|---|---|---|---|---|---|
|  | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 0 | 0 | 0 | 3 | 0000 |
| COMMON BLOCK | N/A | 1 | 2 | 0 | YYYY |

FIG. 8F

| COMMUNICATION DATA INFORMATION AT CORRESPONDING GBU/LBU POSITION ||||||
|---|---|---|---|---|---|
|  | token | IP Number | Priority Level | PREVIOUSLY-PASSED IP Number | DATA |
| LBU#1 (IP Number 1) | 1 | 3 | 4 | 3 | XXXX |
| LBU#2 (IP Number 2) | X | X | X | X | 0000 |
| LBU#3 (IP Number 3) | X | X | X | X | 0000 |
| GBU (IP Number 0) | 0 | 0 | 0 | 3 | 0000 |
| COMMON BLOCK | N/A | 1 | 2 | 0 | 0000 |

FIG. 8G

| COMMUNICATION DATA INFORMATION AT CORRESPONDING GBU/LBU POSITION ||||||
|---|---|---|---|---|---|
|  | token | IP Number | Priority Level | PREVIOUSLY-PASSED IP Number | DATA |
| LBU#1 (IP Number 1) | X | X | X | X | 0000 |
| LBU#2 (IP Number 2) | 1 | 3 | 4 | 3 | XXXX |
| LBU#3 (IP Number 3) | X | X | X | X | 0000 |
| GBU (IP Number 0) | 0 | 0 | 0 | 1 | 0000 |
| COMMON BLOCK | N/A | 1 | 2 | 0 | 0000 |

FIG. 8H

| COMMUNICATION DATA INFORMATION AT CORRESPONDING GBU/LBU POSITION ||||||
|---|---|---|---|---|---|
|  | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | 1 | 3 | 4 | 3 | XXXX |
| GBU (IP Number 0) | 0 | 0 | 0 | 1 | 0000 |
| COMMON BLOCK | N/A | 1 | 2 | 0 | 0000 |

FIG. 8I

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 1 | 3 | 4 | 3 | XXXX |
| COMMON BLOCK | N/A | 1 | 2 | 0 | 0000 |

FIG. 8J

| COMMUNICATION DATA INFORMATION AT CORRESPONDING GBU/LBU POSITION | | | | | |
|---|---|---|---|---|---|
| | token | IP Number | Priority Level | PREVIOUSLY-PASSED IP Number | DATA |
| LBU#1 (IP Number 1) | X | X | X | X | 0000 |
| LBU#2 (IP Number 2) | X | X | X | X | 0000 |
| LBU#3 (IP Number 3) | X | X | X | X | 0000 |
| GBU (IP Number 0) | 0 | 0 | 0 | 1 | 0000 |
| COMMON BLOCK | N/A | 3 | 4 | 3 | XXXX |

CONTROL DEVICE AND METHOD OF VEHICLE MULTI-MASTER MODULE BASED ON RING COMMUNICATION TOPOLOGY BASED VEHICLE

CROSS-REFERENCE TO RELATED APPLICATIONS

This U.S. non-provisional patent application claims priority under 35 U.S.C. § 119 of Korean Patent Application No. 10-2017-0168625, filed on Dec. 8, 2017, the entire contents of which are hereby incorporated by reference.

BACKGROUND

The present invention relates to a control device and method for a multi-master module, and more particularly to a control device and method for a multi-master module capable of controlling the use of a common block based on a ring communication topology in a slave device connected to a plurality of master devices.

Recently, automobiles use many electronic control systems with built-in microcontroller unit, and their use is gradually increasing. The microcontroller unit in a vehicle plays an important role in controlling the functions of each device of the vehicle.

As the electronic control system in the vehicle, there are various systems such as a Hybrid Control Unit (HCU) and an Engine Control Unit (ECU) of a hybrid vehicle. In this case, if the common functions used by each electronic control system, for example, the power supply system and the function safety support functions, may be shared and used, this may be very helpful for cost reduction.

However, even when the common functions are integrated, in order to guarantee the independence of each system, logic and registers should be classified into independent blocks and common blocks according to the function of each block.

In this case, when multiple systems simultaneously access a commonly used block or when the operation must be processed so that multiple systems may use the common block at high speed, there is a high possibility that a problem such as a collision occurs.

In particular, in this case, a method in which a plurality of masters access a common block in the order of access first is used. However, in the case of a corresponding method, even if the multi-master within the operating clock range is accessed simultaneously or the master selection area is set later, this may be a problem if the corresponding action is an urgent function.

Therefore, it is required to implement an appropriate control method for preventing collision when accessing a common block so that a plurality of master modules may share a common block.

SUMMARY

The present invention has been made to solve the above-mentioned technical problems, and it is an object of the present invention to substantially complement various problems caused by limitations and disadvantages in the prior art, and the present invention relates to a control device and method for a multi-master device capable of controlling the use of a common block based on a ring communication topology in a slave device connected to a plurality of master devices.

More specifically, when a plurality of master modules (an external module or an internal module) simultaneously accesses a common block, the present invention may determine an access subject among the masters based on a ring communication topology. In particular, to ensure independence when controlling the function of each master, a plurality of masters constitute a unique dedicated buffer.

To ensure the independence of multiple masters when controlling the function of each master, the prior art uses a method of constructing an access area unique to each master and approaching a common block according to the order set by the master first. However, in this method, since one master preempts a communication path when accessing a specific common block, when other masters access one common block at the same time, there is a problem that the time for data processing of each master is delayed due to a bottleneck phenomenon. And, as the number of multiple masters increases, the number of transmitting terminals and the number of receiving terminals increase, which causes a problem that the logic size and logic complexity of the entire system increase.

In order to solve such a problem, this patent is a method of controlling a multi-master with a ring communication topology-based internal communication structure. Each master has a corresponding 2D buffer for each of the masters, and the buffers are connected on the ring communication topology. The multi-master is controlled through communication between each 2D buffer corresponding to each master, that is, the Global Buffer Unit (GBU) and the Local Buffer Unit (LBU). Ring communication topology may basically only access blocks in one direction (Unidirectional). After passing the access data of the corresponding master stored in LBU to GBU, a method of accessing a common block is used.

An embodiment of the inventive concept provides a collision prevention system of a multi-master including: a plurality of external modules; and an integrated device, wherein the integrated device includes: a plurality of interfaces connected respectively to the plurality of external modules and respectively controlled by corresponding external modules; a plurality of internal modules; a plurality of dedicated buffers connected respectively to the plurality of interfaces and the plurality of internal modules; and a common block connected to the plurality of dedicated buffers and controlled by the plurality of interfaces and the plurality of internal modules, wherein the plurality of dedicated buffers include a global buffer unit (GBU) and a plurality of local buffer units (LBUs), wherein the GBU and the plurality of LBUs are connected to two neighboring GBUs and a plurality of LBUs to form a ring communication topology, and the ring communication topology transmits ring communication data in one direction, wherein the common block is connected to the ring communication topology through the GBU.

In an embodiment, the ring communication data may include a token, an IP number for the external module or the internal module, a priority value, operation data for the common block, and a previously-passed IP number.

In an embodiment, when the plurality of LBUs simultaneously have ring communication data received from neighboring LBUs on the ring communication topology and ring communication data to be written, a priority value of the received ring communication data may be compared with a priority value of the ring communication data to be written to determine ring communication data to be passed on the ring communication topology.

In an embodiment, when transmitting ring communication data to the common block, the GBU may remove a token of ring communication data and transmit it to the common block.

In an embodiment, the plurality of LBUs and the GBU may include a 2 dimensional (2D) buffer.

In an embodiment of the inventive concept, provided is a collision prevention method of a multi-master in a collision prevention system of a multi-master including: a plurality of external modules; and an integrated device, wherein the integrated device includes: a plurality of interfaces connected respectively to the plurality of external modules and respectively controlled by corresponding external modules; a plurality of internal modules; a plurality of dedicated buffers connected respectively to the plurality of interfaces and the plurality of internal modules; and a common block connected to the plurality of dedicated buffers and controlled by the plurality of interfaces and the plurality of internal modules, wherein the plurality of dedicated buffers include a global buffer unit (GBU) and a plurality of local buffer units (LBUs), wherein the GBU and the plurality of LBUs are connected to two neighboring GBUs and a plurality of LBUs to form a ring communication topology, and the ring communication topology passes ring communication data in one direction. The method includes: writing the ring communication data by any one of the plurality of LBUs; and passing the ring communication data to a GBU according to the ring communication topology.

In an embodiment, the ring communication data may include a token, an IP number for the external module or the internal module, a priority value, operation data for the common block, and a previously-passed IP number.

In an embodiment, the method may further include, when the plurality of LBUs simultaneously have ring communication data received from neighboring LBUs on the ring communication topology and ring communication data to be written, comparing a priority value of the received ring communication data with a priority value of the ring communication data to be written to determine ring communication data to be passed on the ring communication topology.

In an embodiment, the transmitting of the ring communication data from the GBU to the common block may further include removing a token of the ring communication data.

In an embodiment, the plurality of LBUs and the GBU may include a 2-dimensional (2D) buffer.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 5A to 5E are views showing a data passing example of a ring communication topology according to an embodiment of the present invention.

FIGS. 6A to 6J and FIG. 7 are views showing another data passing example of a ring communication topology according to an embodiment of the present invention.

FIGS. 8A to 8J and FIG. 9 are views showing another data passing example of a ring communication topology according to an embodiment of the present invention.

DETAILED DESCRIPTION

The following content merely illustrates the principles of the invention. Therefore, those skilled in the art will be able to devise various devices which, although not explicitly described or illustrated herein, embody the principles of the invention and are included in the concept and scope of the invention. Furthermore, all of the conditional terms and embodiments listed herein are, in principle, intended to be purely for purposes of understanding the concepts of the invention, and are not to be construed as limited to the specifically recited embodiments and conditions.

The above objects, features and advantages will be described in detail below with reference to the accompanying drawings, and accordingly, those skilled in the art may easily implement the technical idea of the present invention.

Figure 1:
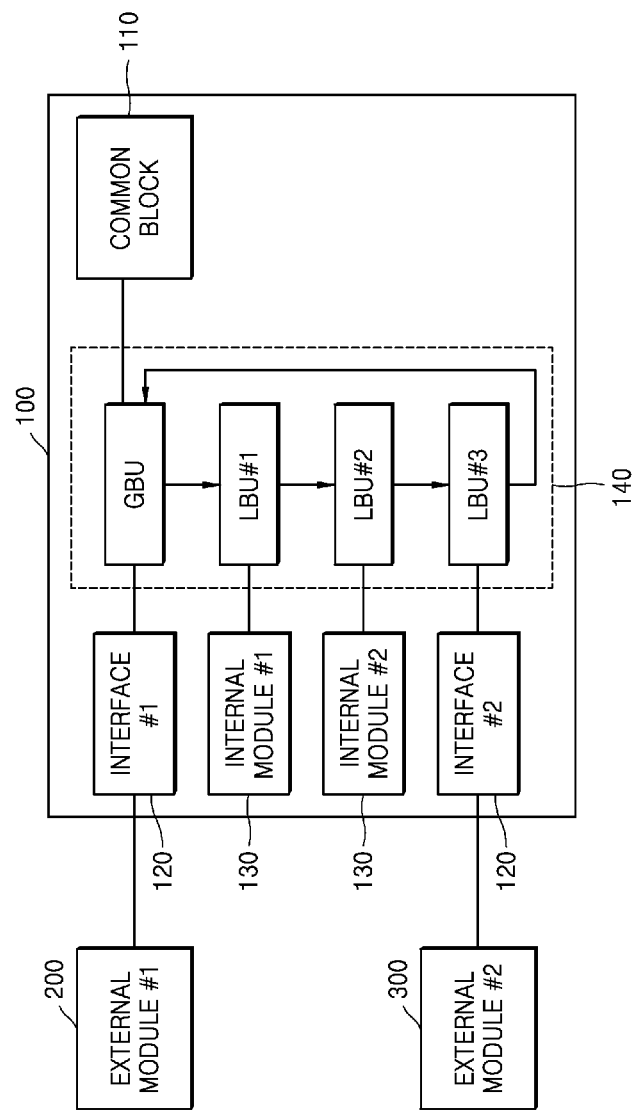
FIGS. 1 and 2 show a block diagram of an integrated device connected to a multi-master according to an embodiment of the present invention.

FIG. 1 is a block diagram of a multi-master collision prevention system including an integrated device connected to a multi-master according to an embodiment of the present invention.

The multi-master collision prevention system of the present invention includes a plurality of external modules (a first external module 200 and a second external module 300) and an integrated device 100.

The plurality of external modules 200 and 300 are modules existing outside the integrated device 100. Preferably, the external modules 200 and 300 are external systems (or chips) that may operate as masters and are connected to the interface of the integrated device 100. For example, the external modules 200 and 300 may be a Hybrid Control Unit (HCU), a Microcontroller of an Engine Control Unit (ECU), a Vehicle Controller (VCU) of an Electric Vehicle, a Motor Controller (MCU), a Low Voltage DC-DC Converter (LDC), and the like.

Meanwhile, the integrated device 100 includes a plurality of interfaces 120, a plurality of internal modules 130, a plurality of dedicated buffers 140 connected to the plurality of internal modules and the external modules, respectively, and a common block 110. At this time, the integrated device 100 may be, for example, an integrated power system for a vehicle that supplies power to the motor and the engine of the hybrid vehicle.

The plurality of interfaces 120 connect the external modules 200 and 300 to the corresponding dedicated buffers 140. In this embodiment, the plurality of interfaces 120 may be, for example, a Serial Peripheral Interface (SPI) communication module. However, the plurality of interfaces 120 are not limited to the SPI communication module, and for example, may be various types of interfaces such as a Controller Area Network (CAN) or a Local Interconnect Network (LIN).

Figure 2:
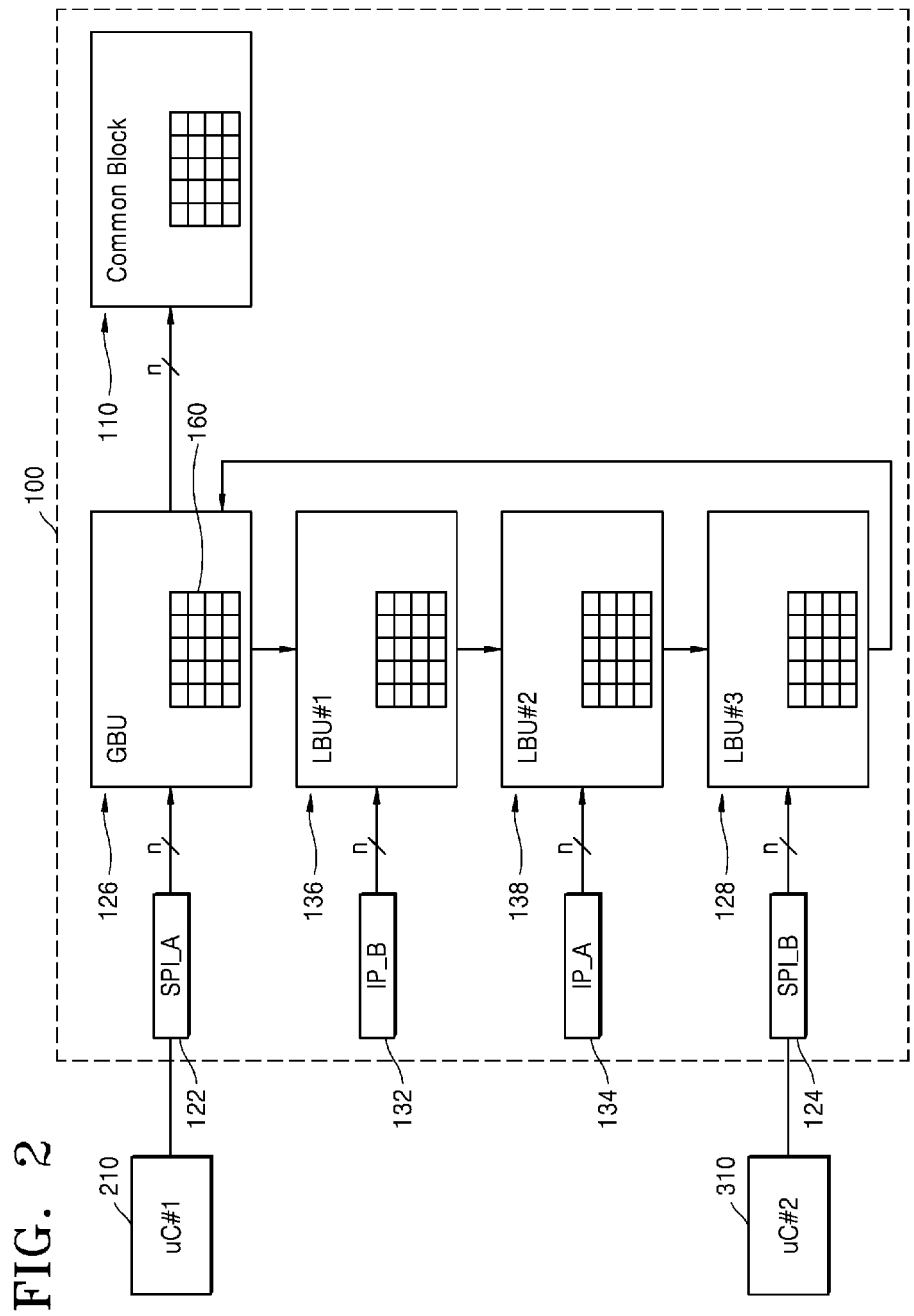

When the interface 120 connected to the first external module 200, that is, the first communication unit 122 of FIG. 2, is an SPI, the first external module 200 may operate as a master with respect to the first communication unit 122. That is, the first external module 200 operates as a master by providing a chip select signal and a clock to the first communication unit 122, and the first communication unit 122 may operate as a slave.

Meanwhile, the internal module 130 may be an independent functional block in the integrated device 100, and for example, may be a control block or an internal memory block. For example, it may be implemented as a semiconductor intellectual property (IP). For example, if the integrated device 100 is a power system chip, the internal module 130 may be an IP for controlling the power system. Or the internal module 130 may be a power system chip internal memory.

In this case, the external modules 200 and 300 and the internal module 130 may operate as a master with respect to the common block 110. That is, the external modules 200 and 300 and the internal module 130 may control the common block 110 to acquire necessary data or to control the common block 110 to perform necessary operations.

The plurality of dedicated buffers 140 are buffers for storing information necessary for operation of the internal module 130 or the external modules 200 and 300 and are connected to the internal module 130 or the interface 120 in one-to-one correspondence. At this time, the plurality of dedicated buffers 140 are connected to each other in the ring communication topology.

Ring communication topology is a method of network topology, and is a network configuration in which each node is connected to two neighboring nodes and communicates through one continuous path as a whole like a ring. At this time, each of the plurality of dedicated buffers 140 corresponds to one node of the ring communication topology.

The plurality of dedicated buffers 140 include a global buffer unit (GBU) and a local buffer unit (LBU). The GBU is directly connected to the register of the common block 110, and the LBU is connected to two neighboring LBUs or GBUs to form a ring communication topology.

The register of the common block 110 is a space for storing information necessary for operation of the common block of the integrated device 100. The data transferred by the GBU may be written or read and the common block 110 may operate based on the data written to the register of the common block 110.

Hereinafter, an embodiment of a multi-master collision prevention system according to the present invention will be described with reference to FIG. 2.

In the multi-master collision prevention system according to the present invention, the first external module 210 is, for example, a micro-controller of a Hybrid Control Unit (HCU), and the second external module 310 may be, for example, a microcontroller of an Engine Control Unit (ECU).

The first and second interfaces 122 and 124 may be implemented as an SPI communication module.

The plurality of dedicated buffers 126, 136, 138 and 128 are buffers used independently in the plurality of external modules 210 and 310 and the plurality of internal modules 130, respectively. For example, the dedicated buffer 126 connected to the first external module 210 may be a buffer for performing an operation related to the HCU independently. In addition, the dedicated buffer 128 connected to the second external module 124 may be a buffer for performing an operation related to the ECU independently.

If the integrated device 100 is an automotive power system, the common block 110 may be a common block such as a real time clock (RTC), a low side driver (LSD), and a high side driver (HSD) in the integrated device 100.

Ring communication topology is a method of network topology, and is a network configuration in which each node is connected to two neighboring nodes and communicates through one continuous path as a whole like a ring. At this time, each of the plurality of dedicated buffers 140 corresponds to one node of the ring communication topology.

The plurality of dedicated buffers 140 include a global buffer unit (GBU) 126 and local buffer units (LBUs) 136, 138, and 128. The GBU is directly connected to the register of the common block 110, and the LBUs 136, 138, and 128 are connected to two neighboring LBUs or GBUs 126 to form a ring communication topology.

In this case, the GBU 126 and the LBUs 136, 138, and 128 utilize a 2-Dimensional (2D) Buffer. The 2D buffer is a structure in which a plurality of line buffers having a constant bit width are arranged to have a width and a height.

The reason for utilizing the 2D buffer in the embodiment of the present invention is as follows.

First, a delay due to data retransmission may occur when there is no internal buffer as utilizing only a single line buffer.

Secondly, when a large number of masters transmit/receive data, the amount of data increases suddenly due to communication characteristics. This may be prevented by using a 2D buffer.

In addition, lastly, the 2D buffer may be utilized as a temporary storage space for transmission data for the purpose of preventing transmission data loss in the event of a bottleneck.

Through this configuration, when a plurality of external or internal modules access the common block 110 of the integrated device 100 at the same time, the multi-master collision prevention system according to the present invention may perform the use of the common block without collision based on the ring communication topology. Or, even if another external or internal module already uses the common block, in a case where an external or internal module requires the use of highly urgent features, the multi-master collision prevention system according to the present invention may control the functions of other modules with low urgency to be performed again after the urgent functions are executed first.

Also, the multi-master collision prevention system according to the present invention may minimize the bottleneck due to the simultaneous access of multiple masters to the common block.

Moreover, the operation of this multi-master collision prevention system is as follows.

First, when one master (external or internal module) tries to access the common use block, the ring communication data is written to the 2D buffer (GBU 126 or LBUs 136, 138, and 128) corresponding to the corresponding module.

Figure 3:
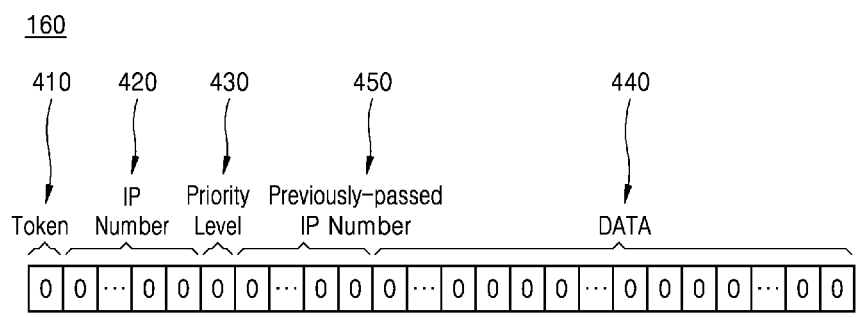
FIG. 3 is a view showing a data structure of ring communication data in a ring communication topology according to an embodiment of the present invention.
Figure 4:
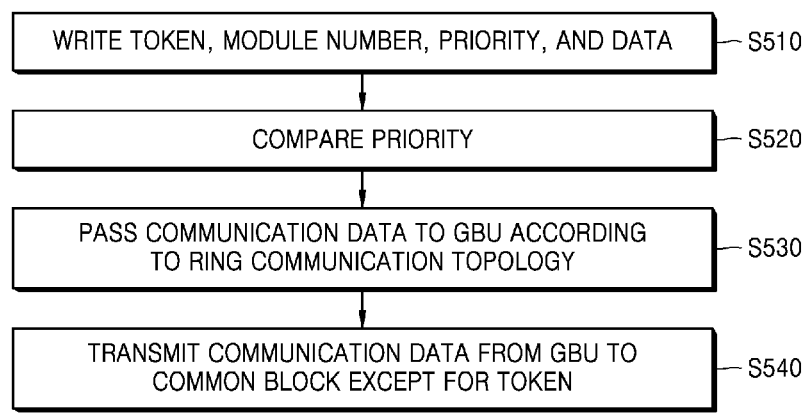
FIG. 4 is a flowchart showing the operation of a multi-master and integrated device according to an embodiment of the present invention.

The ring communication data includes a token 410, an IP number 420, a priority value 430, operation data 440, and a previously-passed IP number 450. (see FIG. 3).

In this case, the token 440 is configured to have a value of, for example, "0" or "1". In the ring communication topology, a token indicates whether the module (external or internal module) writes data into the ring communication topology. For example, if the token value is "0", the corresponding LBU may know that the ring communication data is not written in the buffer (GBU or LBU) of a previous module in the ring communication topology. On the other hand, if the token value is "1", the corresponding LBU may know that the ring communication data is written in the buffer (GBU or LBU) of a previous module in the ring communication topology.

The ring communication topology is always passing data in the ring direction, and may be represented by a token when the data is carried and passed.

However, unlike the LBUs 136, 138 and 128, the GBU 126 receives the ring communication data and transmits the token value to the register of the common block 110 except for the token value.

The IP number 420 is data that allows the common block 110 to know from which module (external or internal module) is transmitted, and in the common block 110, an operation related to the corresponding module is executed based on the IP number 420.

When the neighboring LBUs 136, 138, and 128 on the ring communication topology or the GBU 126 receive the ring communication data, the priority value 420 is data for determining whether ring communication data to be written by the LBU 136, 138, and 128 or the GBU 126 receiving the ring communication data should be processed first, or whether the received ring communication data should be processed first according to the ring communication topology.

The operation data 440 is data indicating parameters required for control or operation in the common block 110.

The previously-passed IP number 450 is the IP number of the ring communication data passed in the immediately preceding cycle. Through the previously-passed IP number 450, each of the LBUs 136, 138, and 128 may know whether or not the data is passed through according to the priority. Each of the LBUs 136, 138, and 128 may retry passing if it has data that is not processed by the priority in the immediately preceding cycle.

Hereinafter, a case where a plurality of masters attempts to access the common block 110 will be described with reference to FIG. 2.

When a plurality of masters (external or internal modules) attempt to access the common block 110, since the ring communication data is written into the 2D buffer (LBU 136, 138, and 128 or GBU 126) corresponding to the corresponding master, the problem of collision may be prevented.

In this case, the LBUs 136, 138, and 128 will pass ring communication data on the ring communication topology.

In addition, the GBU 126 removes the token value 410 from the ring communication data received in the 2D buffer 160 on the ring communication topology and transmits it to the common block 110. However, when the GBU 126 attempts to access the common block 110 in the module 210 corresponding to the GBU 126, it is possible to transmit the data directly to the common block 110 without writing the token value.

If the LBUs 136, 138, and 128 that receive the ring communication data from the neighboring LBUs 136, 138, and 128 on the ring communication topology have ring communication data to be written to access the common block 110, by comparing the received ring communication data with the priority order of the ring communication data to be written, the high priority ring communication data may be processed to be able to pass to the neighboring LBUs 136, 138, and 128 on the ring communication topology first.

For example, when the priority value of the received ring communication data is "0" and the priority value of the ring communication data to be written is "1", first, the received ring communication data may be passed to the neighboring LBUs 136, 138, and 128 on the ring topology.

On the other hand, when the priority value of the received ring communication data is "1" and the priority value of the ring communication data to be written is "0", first, the ring communication data to be written may be transmitted before the ring communication data received by the neighboring LBUs 136, 138, and 128 on the ring topology.

Preferably, the priority value may be implemented simply as about 1 bit. That is, the priority value may be simply implemented as "0" or "1". Priority "0" may be assigned only for processing that requires a high urgency in the vehicle, such as processing of engine interruption, storing of existing data at the time of resetting of the microprocessor unit, and the like, and priority "1" may be assigned and processed for other processes.

In an embodiment of the present invention, when the ring communication data is passed in the ring communication topology, the ring communication data is passed in only one direction, so that even if multiple masters attempt to access the common block 110 at the same time, collisions may be prevented.

On the other hand, the LBU may be placed close to the GBU on the ring communication topology in consideration of the priority of the function to be processed.

For example, at design time, if it is determined that a function of processing the function of the internal module 134 first prior to the function of the internal module 132 is important, the LBU 138 corresponding to the internal module 134 may be installed closer to the GBU 126 in the ring communication topology than the LBU 136 corresponding to the internal module 132 as shown in FIG. 2.

Hereinafter, the operation of the multi-master collision prevention system according to an embodiment of the present invention will be described in detail with reference to FIGS. 4 to 9.

First, when the external module 210 or the internal module 132 attempts to access the common block 110, the token 410 of the ring communication data, the IP number 420, the priority 430, and the operation data 440 are written to the corresponding GBU 126 or the LBUs 126, 136, 138, and 128 (operation S510).

At this time, when there is ring communication data received through the ring communication topology (see LBU #3 in FIG. 7(c)), the priority 430 may be compared (operation S520).

Then, the ring communication data is passed on the ring communication topology when the priority 430 is high (for example, when the priority value 430 is low) (operation S530).

When the GBU 126 receives the ring communication data, the GBU 126 removes the ring communication data from the token and transmits it to the common block 110 (operation S540).

In the case of FIGS. 5A to 5E, it shows that when the LBU (LBU #1 136) accesses the common block 110 alone, that is, when the LBU #1 (IP Number 1) accesses a single common block, the ring communication data is moved through its dedicated buffer. Here, the portion where the shadow is inserted, for example, the LBU #1 portion in FIG. 5A, is the position to pass the ring communication topology bus.

In the order of FIGS. 5A, 5B, 5C, 5D and 5E, the data written in the LBU #1 (IP Number 1, 136) is passed on the ring communication topology and transferred to the common block 110 through the GBU 126. In this case, it is assumed that the previously-passed IP number is 0 in FIG. 5A. That is, as a case where there is no previous transmission in FIG. 5A, it is assumed that the previously-passed IP number has a default value of 0, or that the IP that previously transmitted the packet to the common block 110 is the GBU (IP Number 0).

At this time, LBU #2 to LBU #3 and GBU are nodes in the ring communication topology, and the data written in the LBU #1 (IP Number 1, 136) passes LBU #2 to LBU #3.

The GBU node removes the token information, transmits the data to the common block 110, and updates the previously-passed IP number from 0 to 1.

FIGS. 6A to 6J and FIG. 7 illustrate a case where two LBUs LBU #1 and LBU #3 attempt to access the common block 110 simultaneously, and LBU #1 has a high priority. Like FIG. 5A, as a case where there is no previous transmission in FIG. 6A, it is assumed that the previously-passed IP number has a default value of 0, or that the IP that previously transmitted the packet to the common block 110 is the GBU (IP Number 0).

In FIGS. 6A and 6B, the corresponding module is passed through the ring communication topology.

But, referring to FIG. 7, FIG. 6C is a case where when the ring communication data of LBU #1 (IP Number 1) is moved to the LBU #3 (IP Number 3) position node through the ring communication topology bus, LBU #3 (IP Number 3) attempts to write ring communication data to access the common block.

In this case, LBU #3 performs priority comparison and at this time, since LBU #1 (IP Number 1) has a high priority, the data of LBU #3 (IP Number 3) is held in the dedicated buffer of LBU #3.

Thereafter, in FIGS. 6D and 6E, the GBU removes the token and again update the previously-passed IP number to 1 while transmitting the data packet to the common block 110.

Again, in FIGS. 6F and 6G, the ring communication data is transmitted on the ring communication topology bus. In particular, the updated previously-passed IP number (the previous transmission IP number) is passed.

After that, in FIG. 6H, after LBU #3 checks the previously-passed IP number, the ring communication data packet that is tried for transmission before but is not transmitted to the common block 110 is written again on the ring communication topology bus.

After that, the ring communication data written to the GBU node is passed in FIG. 6I, and after the token is removed in FIG. 6J, the previously-passed IP number is updated from 1 to 3 while transmitting it to the common block 110.

FIGS. 8A to 8J and FIG. 9 illustrate a case where two LBUs LBU #1 and LBU #3 attempt to access the common block 110 simultaneously, and LBU #3 has a high priority. Like FIG. 5A, as a case where there is no previous transmission in FIG. 8A, it is assumed that the previously-passed IP number has a default value of 0, or that the IP that previously transmitted the packet to the common block 110 is the GBU (IP Number 0).

In FIGS. 8A and 8B, the corresponding module is passed through the ring communication topology.

Figure 9:

But, referring to FIG. 9, FIG. 8C is a case where when the ring communication data of LBU #1 (IP Number 1) is moved to the LBU #3 (IP Number 3) position node through the ring communication topology bus, LBU #3 (IP Number 3) attempts to write ring communication data to access the common block.

In this case, LBU #3 performs priority comparison, and at this time, LBU #3 (IP Number 3) has a high priority. In this case, the data of LBU #1 (IP Number 1) is already held in the dedicated buffer of LBU #1.

Thereafter, in FIGS. 8D and 8E, the GBU removes the token and again update the previously-passed IP number to 3 while transmitting the data packet to the common block 110.

Again, in FIG. 8F, after LBU #3 checks the previously-passed IP number, the ring communication data packet that is tried for transmission before but is not transmitted to the common block 110 is written again on the ring communication topology bus.

After that, in FIGS. 6G to 6I, the ring communication data written in LBU #1 is passed to the GBU on the ring communication topology bus.

After that, in FIG. 6J, after removing the token, the GBU updates the previously-passed IP number from 3 to 1 while transmitting it to the common block 110.

Therefore, according to the present invention, it is possible to integrate a plurality of systems, which conventionally operate as slaves, into one system and solve the problems due to integration.

At this time, in the integrated system, by dividing the resources available to the multi-master into independent blocks and shared blocks, the cost and complexity of existing systems may be significantly improved while ensuring the independence of each system. And, if several multi-masters access a common block simultaneously or if it is a late-action but needs to perform a very important function quickly, it solves potential problems to significantly improve system safety.

In addition, when several masters access a common block simultaneously, there may be a delay due to a bottleneck. Packet collision may be prevented by token passing because of ring communication topology. In addition, it is relatively easy to implement and reconfigure, and defect isolation is simple, so that system configuration is easy. Also, the logic complexity of the communication structure is low and the logic size is small.

Also, since the buffers of all masters are accessible to the token, a transmission opportunity may be obtained, and thus there is no bottleneck between the masters, and traffic communication time between IPs is fast (data transmission in 1 cycle).

Meanwhile, although the present invention has been described with reference to the embodiments shown in the drawings, it is only illustrative, and it will be understood by those skilled in the art that various changes and modifications may be made without departing from the scope of the present invention. Accordingly, the true scope of the present invention should be determined by the technical idea of the appended claims.

Although the embodiments of the present invention have been described, it is understood that the present invention should not be limited to these embodiments but various changes and modifications may be made by one ordinary skilled in the art within the spirit and scope of the present invention as hereinafter claimed.

What is claimed is:

1. A collision prevention system of a multi-master, the collision prevention system comprising:
   a plurality of external modules; and
   an integrated device,
   wherein the integrated device comprises:
   a plurality of interfaces connected respectively to the plurality of external modules and respectively controlled by corresponding external modules;
   a plurality of internal modules;

a plurality of dedicated buffers connected respectively to the plurality of interfaces and the plurality of internal modules; and a common block connected to the plurality of dedicated buffers and controlled by the plurality of interfaces and the plurality of internal modules, wherein the plurality of dedicated buffers comprises a global buffer unit (GBU) and a plurality of local buffer units (LBUs), wherein the GBU and the plurality of LBUs are connected to two neighboring GBUs and a plurality of LBUs to form a ring communication topology, and the ring communication topology transmits ring communication data in one direction, wherein the common block is connected to the ring communication topology through the GBU, and wherein the ring communication data comprises a token, an IP number for the external modules or the internal modules, a priority value, operation data for the common block, and a previously-passed IP number.

2. The system of claim 1, wherein when the plurality of LBUs simultaneously have ring communication data received from neighboring LBUs on the ring communication topology and ring communication data to be written, a priority value of the received ring communication data is compared with a priority value of the ring communication data to be written to determine ring communication data to be passed on the ring communication topology.

3. The system of claim 1, wherein when transmitting ring communication data to the common block, the GBU removes a token of ring communication data and transmits it to the common block.

4. The system of claim 1, wherein the plurality of LBUs and the GBU comprise a 2 dimensional (2D) buffer.

5. A collision prevention method of a multi-master in a collision prevention system of a multi-master comprising: a plurality of external modules; and an integrated device, wherein the integrated device comprises: a plurality of interfaces connected respectively to the plurality of external modules and respectively controlled by corresponding external modules; a plurality of internal modules; a plurality of dedicated buffers connected respectively to the plurality of interfaces and the plurality of internal modules; and a common block connected to the plurality of dedicated buffers and controlled by the plurality of interfaces and the plurality of internal modules, wherein the plurality of dedicated buffers comprise a global buffer unit (GBU) and a plurality of local buffer units (LBUs), wherein the GBU and the plurality of LBUs are connected to two neighboring GBUs and a plurality of LBUs to form a ring communication topology, and the ring communication topology passes ring communication data in one direction, the method comprising:

writing the ring communication data by any one of the plurality of LBUs; and passing the ring communication data to a GBU according to the ring communication topology, wherein the ring communication data comprises a token, an IP number for the external modules or the internal modules, a priority value, operation data for the common block, and a previously-passed IP number.

6. The method of claim 5, further comprising, when the plurality of LBUs simultaneously have ring communication data received from neighboring LBUs on the ring communication topology and ring communication data to be written, comparing a priority value of the received ring communication data with a priority value of the ring communication data to be written to determine ring communication data to be passed on the ring communication topology.

7. The method of claim 5, wherein the transmitting of the ring communication data from the GBU to the common block further comprises removing a token of the ring communication data.

8. The method of claim 5, wherein the plurality of LBUs and the GBU comprise a 2-dimensional (2D) buffer.

* * * * *